(12) United States Patent
Gloski et al.

(10) Patent No.: US 9,305,176 B2
(45) Date of Patent: Apr. 5, 2016

(54) DATABASE GENERATION FROM A SPREADSHEET

(71) Applicant: xOverTime, Inc., Bethel Island, CA (US)

(72) Inventors: David Michael Gloski, Shirley, MA (US); Michael Stephen Lehane, San Francisco, CA (US)

(73) Assignee: xOverTime, Inc., Bethel Island, CA (US)

( * ) Notice: Subject to any disclaimer, the term of this patent is extended or adjusted under 35 U.S.C. 154(b) by 303 days.

(21) Appl. No.: 14/162,081

(22) Filed: Jan. 23, 2014

(65) Prior Publication Data

US 2015/0205847 A1   Jul. 23, 2015

(51) Int. Cl.
*G06F 7/00*     (2006.01)
*G06F 21/62*    (2013.01)
*G06F 17/24*    (2006.01)

(52) U.S. Cl.
CPC .......... *G06F 21/6218* (2013.01); *G06F 17/246* (2013.01); *G06F 21/6227* (2013.01)

(58) Field of Classification Search
CPC .................................................... G06F 17/246
See application file for complete search history.

(56) References Cited

U.S. PATENT DOCUMENTS 5,359,724 A     10/1994    Earle

OTHER PUBLICATIONS

"Essbase", Essbase—Wikipedia, the free encyclopedia; Retrieved from "http://en.wikipedia.org/w/index.php?title=Essbase &oldid=569724487" Categories: Online analytical processing Oracle software, 6 pgs.

*Primary Examiner* — Ajith Jacob
(74) *Attorney, Agent, or Firm* — Schwegman Lundberg Woessner, P.A.

(57) ABSTRACT

A machine may generate a database from a spreadsheet, track the data from its cells as values of variables, and provide such values to authorized users. The machine may receive an upload spreadsheet that was generated by modification of a source spreadsheet by inclusion of control codes, such as a first control code that labels a column of owner names, a second control code that labels a column of measures, and a third control code that labels a column of values of those measures. The machine may parse the upload spreadsheet based on its control codes. The machine may generate a database that contains a data record in which the value of the measure quantifies a variable, and this variable may have a variable name that includes the owner name of the row and the measure of the row. The machine may allow authorized users to download variables and values.

21 Claims, 13 Drawing Sheets

DATABASE GENERATION FROM A SPREADSHEET

TECHNICAL FIELD

The subject matter disclosed herein generally relates to the processing of data. Specifically, the present disclosure addresses systems and methods to facilitate database generation from a spreadsheet.

BACKGROUND

Spreadsheets are commonly used for storing and presenting data. As used herein, the term "spreadsheet" refers to an individual data file that stores information in cells that, when presented by a spreadsheet application on a display screen, are arranged into multiple columns and multiple rows. A single spreadsheet may include multiple worksheets, each having its own columns and rows of cells. In some situations, a spreadsheet may include one or more empty cells (e.g., cells that do not contain any user data). A user may operate a device (e.g., a computer) that executes a spreadsheet application, and the spreadsheet application may enable the user to read a spreadsheet, edit the spreadsheet, and store (e.g., save) the edited spreadsheet.

BRIEF DESCRIPTION OF THE DRAWINGS

Some embodiments are illustrated by way of example and not limitation in the figures of the accompanying drawings.

DETAILED DESCRIPTION

Example methods and systems are directed to database generation from a spreadsheet. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Spreadsheets are commonly used throughout organizations large and small for gathering, calculating, and displaying information. People may use spreadsheets to collect data over time (e.g., with separate columns for each period of time, or with entirely separate workbooks for each period). Over time, these spreadsheets may grow in size, number, or both. In many situations, users are using a spreadsheet when they would be better off using a database. Additionally, if a spreadsheet is copied and emailed to multiple users, version control may be difficult to manage. Also, it may be challenging to track, across multiple copies of a spreadsheet, which user originated which piece of information (e.g., a string, a number, or a formula stored in a particular cell) in a spreadsheet, as well as which users are authorized to access that piece of information.

To address these challenges, a machine (e.g., database generation machine) may be configured (e.g., by suitable software modules) to generate a database from a spreadsheet, track the data from its cells as values of variables, and provide one or more pieces of the data to authorized users. The machine, as configured, may receive an upload spreadsheet that has been generated by modification (e.g., by a first user) of a source spreadsheet. For example, the source spreadsheet may be modified to include one or more control codes (e.g., a first control code that labels a column of owner names, a second control code that labels a column of measures, and a third control code that labels a column of values of those measures). The machine may then parse the upload spreadsheet based on one or more of its included control codes. As an example, the upload spreadsheet may include a row that specifies an owner name for the row, a measure of the row, and a value of the measure of the row. The machine may then generate a database that contains a data record in which the value of the measure quantifies a variable, and this variable may have a variable name that includes the owner name of the row and the measure of the row. The generating of the database may accordingly be based on the row and one or more of the control codes parsed from the upload spreadsheet. Further details are discussed below.

Figure 1:
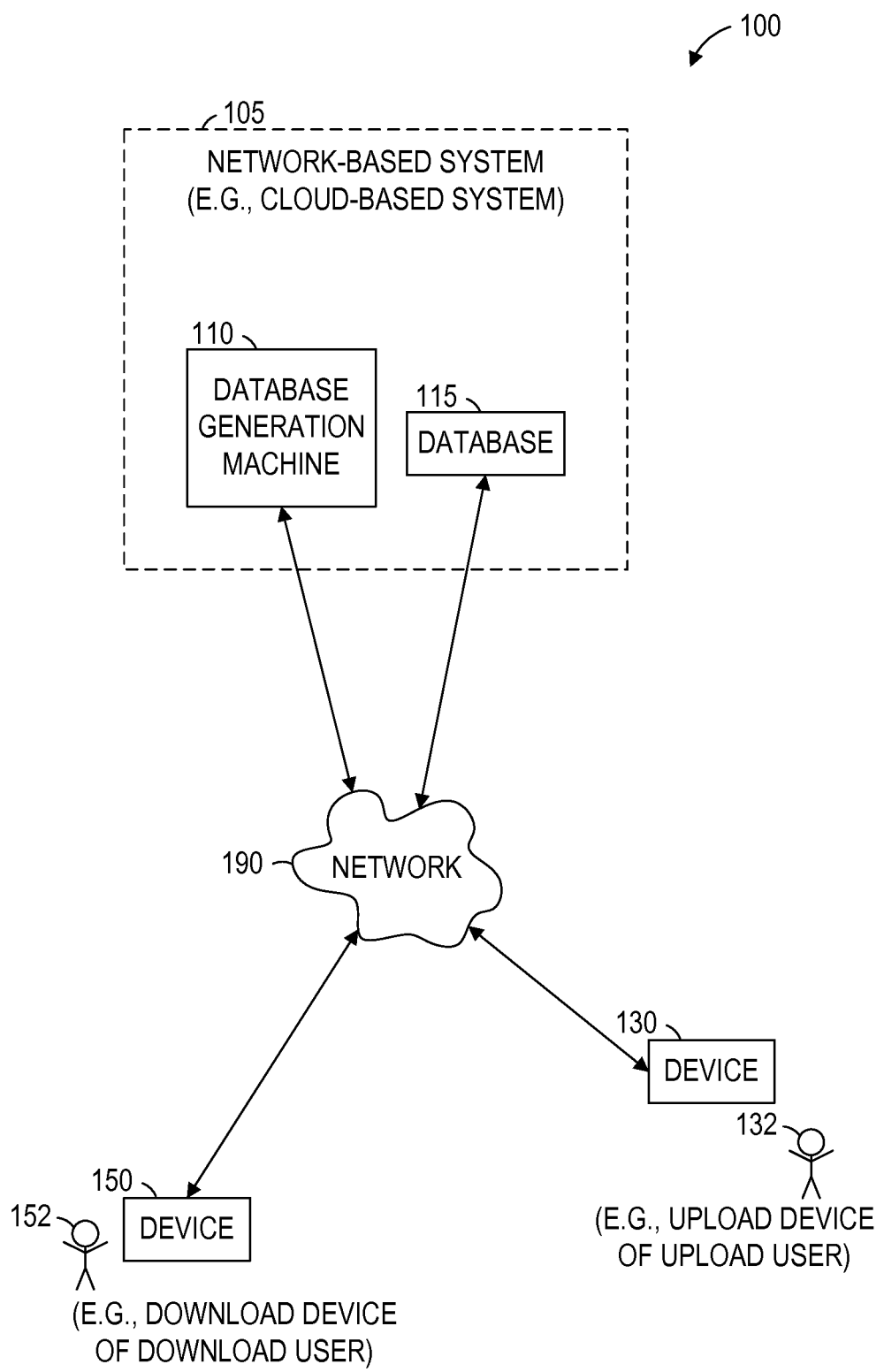
FIG. 1 is a network diagram illustrating a network environment suitable for database generation from a spreadsheet, according to some example embodiments.

FIG. 1 is a network diagram illustrating a network environment 100 suitable for database generation from a spreadsheet, according to some example embodiments. The network environment 100 includes a database generation machine 110, a database 115, and devices 130 and 150, all communicatively coupled to each other via a network 190. The database generation machine 110, the database 115, and the devices 130 and 150 may each be implemented in a computer system, in whole or in part, as described below with respect to FIG. 13. The database generation machine 110, with or without the database 115, may form all or part of a network-based system 105. The network-based system 105 may be a cloud-based server system that provides cloud-based services (e.g., to the devices 130 and 150) for converting source spreadsheets into databases (e.g., database 115), storing such databases, and providing information from the databases (e.g., in ways not possible by copying or emailing the converted source spreadsheets).

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 13. As used herein, a "database" is a data storage resource configured to store structured data in one or more data records. Accordingly, a database (e.g., database 115) may store data structured as a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the database generation machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible medium that is capable of storing, encoding, or carrying instructions for execution by a machine, and includes digital or analog communication signals or other intangible media to facilitate communication of such software.

Figure 2:
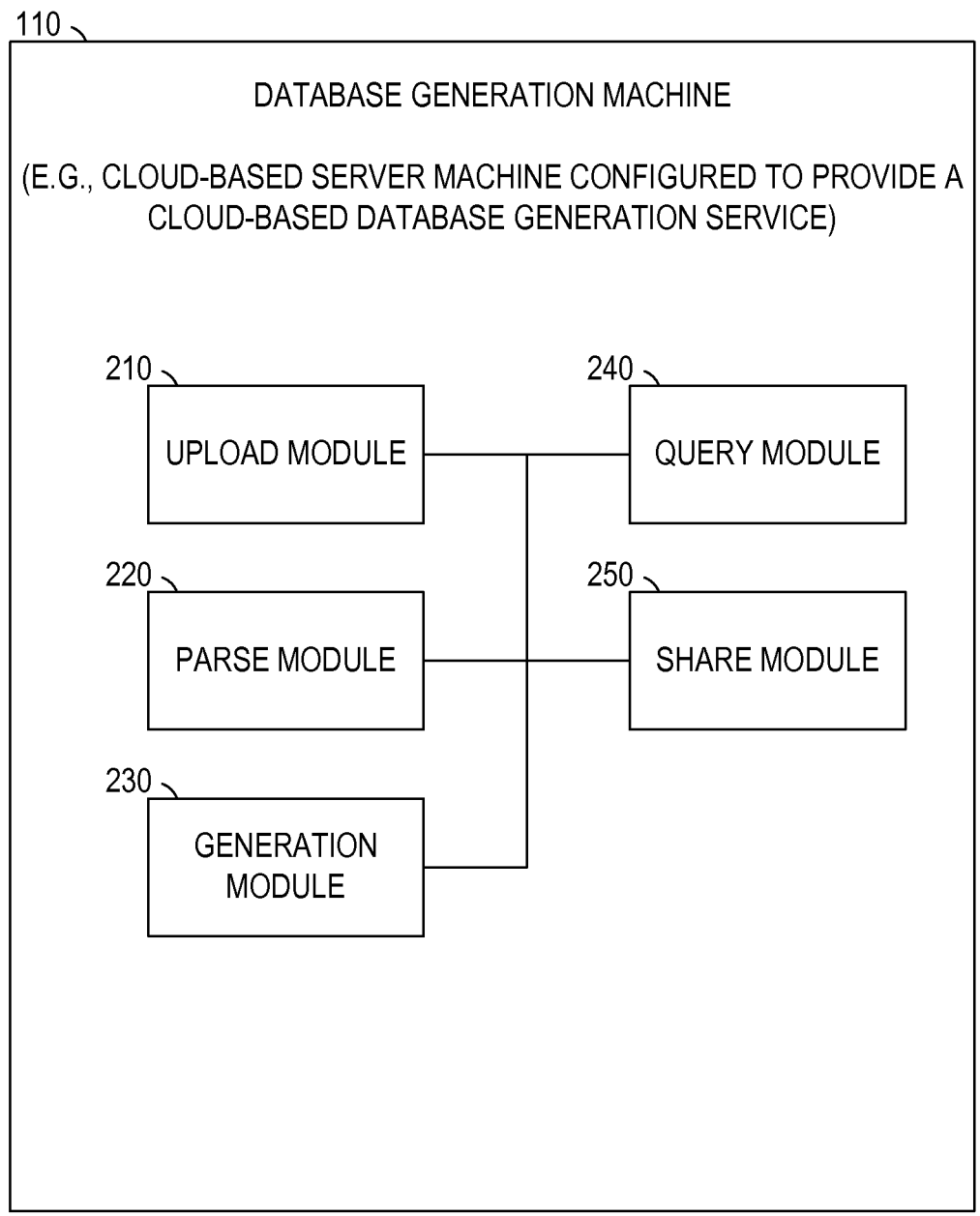
FIG. 2 is a block diagram illustrating components of a database generation machine, according to some example embodiments.

FIG. 2 is a block diagram illustrating components of the database generation machine 110, according to some example embodiments. The database generation machine 110 is shown as including an upload module 210, a parse module 220, a generation module 230, a query module 240, and a share module 250, all configured to communicate with each other (e.g., via a bus, shared memory, or a switch). Further details of these modules are described below with respect to FIG. 9-12. According to some example embodiments, the database generation machine 110 may form all or part of a cloud-based server machine that is configured to provide a cloud-based database generation service (e.g., to one or more of the users 132 and 152 via their respective devices 130 and 150).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
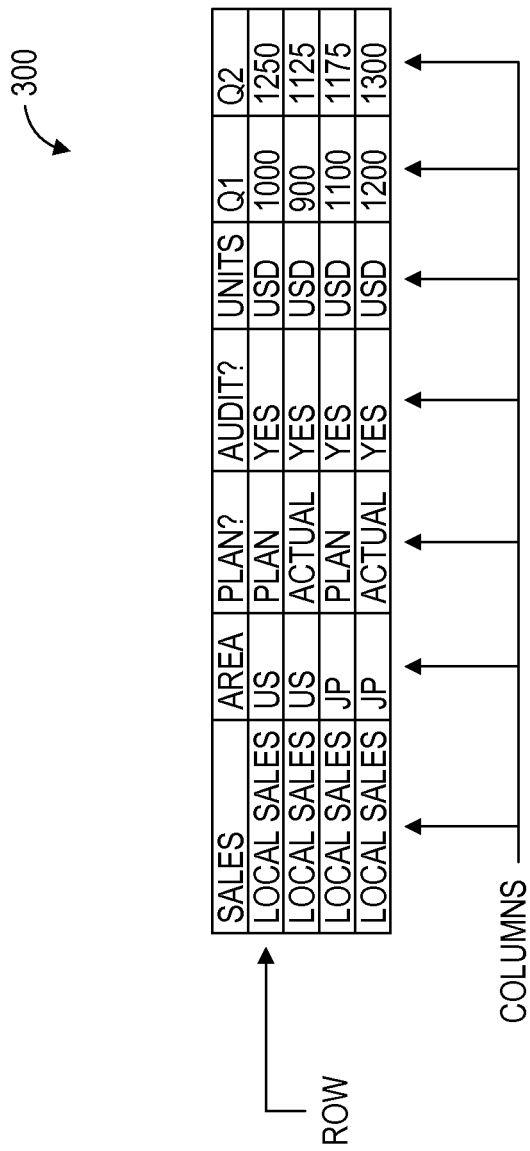
FIG. 3 is an annotated diagram illustrating rows and columns of an unmodified source spreadsheet, according to some example embodiments.

FIG. 3 is an annotated diagram illustrating rows and columns of an unmodified source spreadsheet 300, according to some example embodiments. For clarity, the unmodified source spreadsheet 300 is depicted in the drawings and discussed herein as a single-worksheet spreadsheet (e.g., a spreadsheet that contains only one worksheet), although multi-worksheet spreadsheets (e.g., a spreadsheet that contains multiple worksheets) are contemplated as well. As shown in FIG. 3, the unmodified source spreadsheet 300 has cells structured (e.g., arranged or organized) into rows and columns. A cell may contain any of various data, such as, a value (e.g., a number, a text string, or both), a formula (e.g., an equation that refers to one or more other cells), format information (e.g., font, indentation, foreground color, or background color), or any suitable combination thereof. As indicated by a group of arrows, the seven columns in the unmodified source spreadsheet 300 are labeled (e.g., with header cells in a header row) respectively as "Sales," "Area," "Plan?," "Audit?," "Units," "Q1," and "Q2." As indicated by a single arrow, a single row in the unmodified source spreadsheet 300, for example, contains mutually associated (e.g., mutually correlated) information indicating that local sales in the U.S. area, as planned and audited, in U.S. dollars, were "1000" at one point in time (e.g., "Q1" of a given year) and "1250" at another point in time (e.g., "Q2" of that year).

Figure 4:
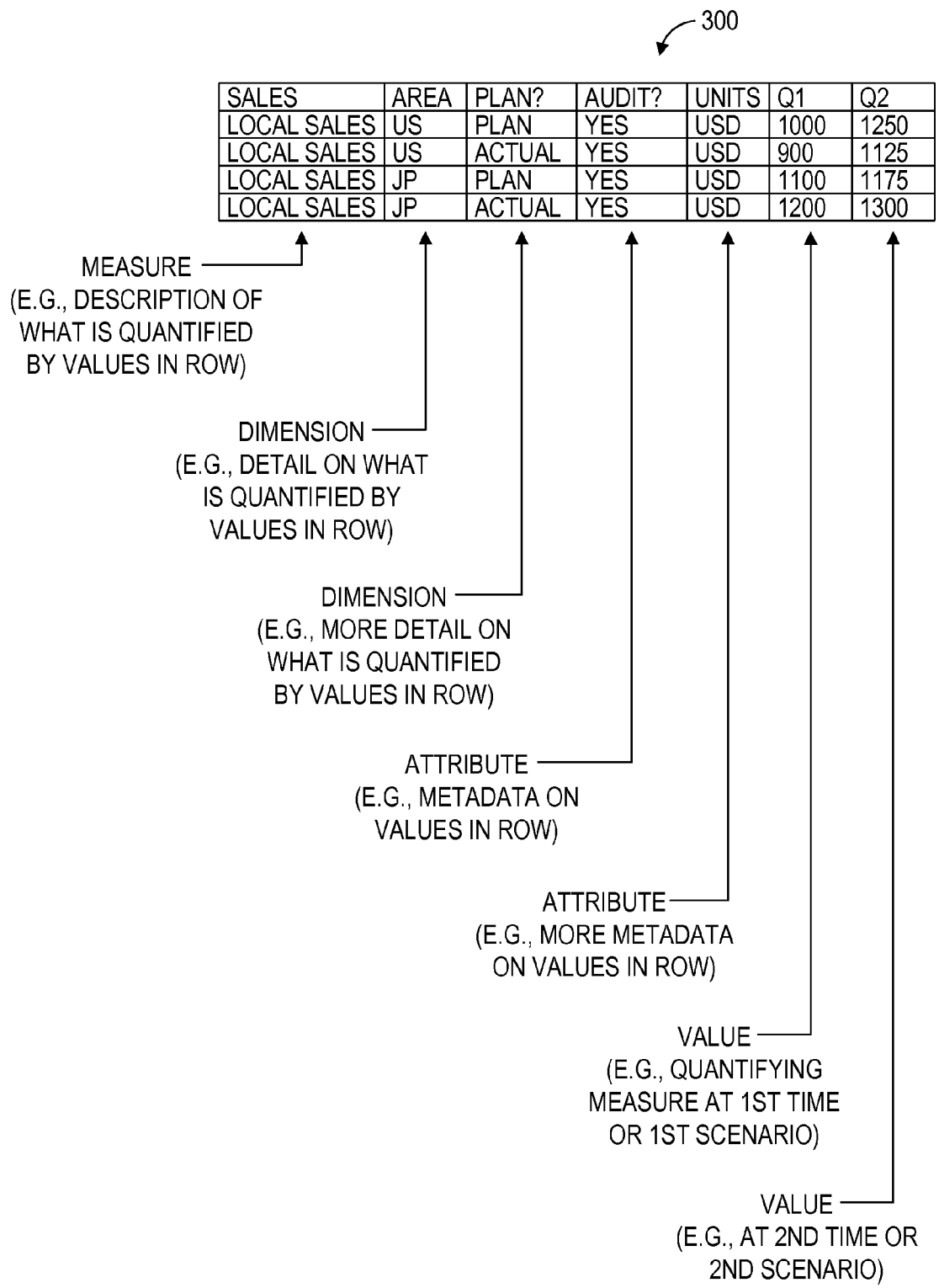
FIG. 4 is an annotated diagram illustrating the columns of the unmodified source spreadsheet, according to some example embodiments.

FIG. 4 is an annotated diagram illustrating the columns of the unmodified source spreadsheet 300, according to some example embodiments. Specifically, the annotations in FIG. 4 describe nomenclature for the columns of the unmodified source spreadsheet 300, as used herein.

As shown in FIG. 4, the leftmost column of the unmodified source spreadsheet 300 (e.g., titled "Sales") may be a column of measures. As used herein, a "measure" is a textual description of what is quantified by one or more values in its row within a spreadsheet (e.g., within its row in a worksheet of the spreadsheet). In the example embodiments illustrated, all four rows of the unmodified source spreadsheet 300 have the text string (e.g., phrase) "local sales" as entries for their measures.

As also shown in FIG. 4, the column second from the left in the unmodified source spreadsheet 300 (e.g., titled "Area") may be a column of dimensions (e.g., a first column of dimensions). As used herein, a "dimension" is a textual detail regarding what is quantified by the one or more values in its row within the spreadsheet (e.g., within its row in a worksheet of the spreadsheet). In the example embodiments illustrated, two rows of the unmodified source spreadsheet 300 have the text string "US" as their entries for a dimension (e.g., for their first dimension), while another two rows have the text string "JP" as their entries for the same dimension (e.g., for their first dimension).

As also shown in FIG. 4, the column third from the left in the unmodified source spreadsheet 300 (e.g., titled "Plan?") may be another column of dimensions (e.g., a second column of dimensions). In the example embodiments illustrated, two rows of the unmodified source spreadsheet 300 have the text string "plan" as their entries for an additional dimension (e.g., their second dimension), while another two rows have the text string "actual" as their entries for the same additional dimension (e.g., their second dimension).

As also shown in FIG. 4, the column fourth from the left in the unmodified source spreadsheet 300 (e.g., titled "Audit?") may be a column of attributes (e.g., a first column of attributes). As used herein, an "attribute" is textual metadata regarding the one or more values in its row within the spreadsheet (e.g., within its row in a worksheet of the spreadsheet). In the example embodiments illustrated, all four rows of the unmodified source spreadsheet 300 have the text string "yes" as their entries for an attribute (e.g., their first attribute).

As also shown in FIG. 4, the column fifth of the left in the unmodified source spreadsheet 300 (e.g., titled "Units") may be another column of attributes (e.g., a second column of attributes). In the example embodiments illustrated, all four rows of the unmodified source spreadsheet 300 have the text string "USD" as their entries for an additional attribute (e.g., their second attribute).

As also shown in FIG. 4, the column sixth from the left in the unmodified source spreadsheet 300 (e.g., titled "Q1") may be a column of values (e.g., a first column of values). As used herein, a "value" specifies or quantifies its measure in its row within the spreadsheet (e.g., within its row in a worksheet of the spreadsheet). Moreover, the value may specify or quantify its measure at a particular time (e.g., a first point in time), during a particular time frame (e.g., a first time span) or in a particular scenario (e.g., a first scenario). For clarity, the discussion herein focuses on a numerical value that quantifies its measure, although a textual value that specifies its measure (e.g., the text string "T-2000 Terminator" specifying a model of a product) is contemplated as well. In the example embodiments illustrated, the four rows of the unmodified source spreadsheet 300 have various numbers (e.g., "1000," "900," "1100," and "1200," respectively) as their values (e.g., their first values at a first point in time, during a first time span, or in a first scenario).

As also shown in FIG. 4, the rightmost column in the unmodified source spreadsheet 300 (e.g., titled "Q2") may be another column of values (e.g., a second column of values). In the example embodiments illustrated, the four rows of the unmodified source spreadsheet 300 have various numbers (e.g., "1250," "1125," "1175," and "1300," respectively) as their additional values (e.g., their second values at a second point of time, during a second time span, or in a second scenario).

Figure 5:
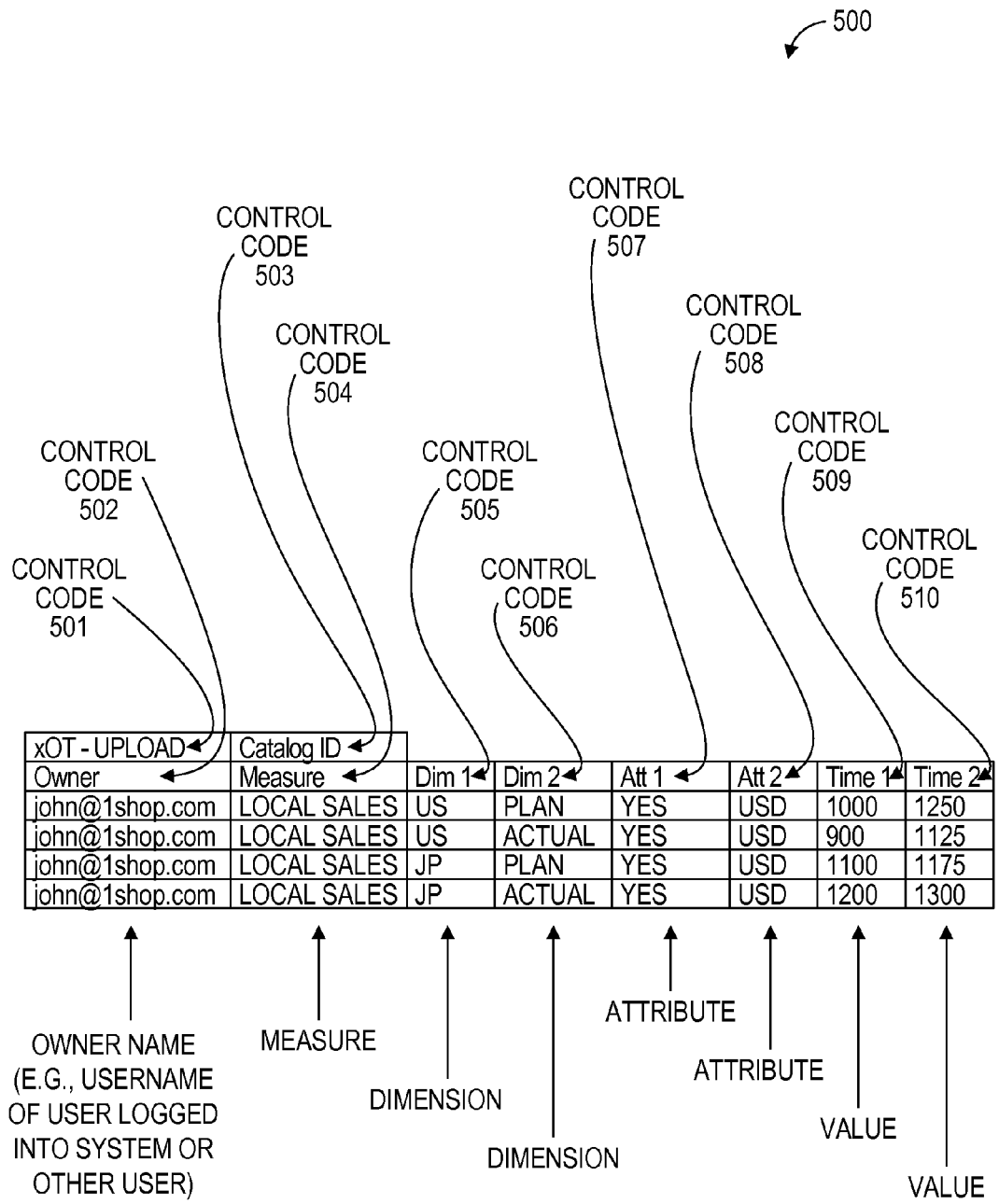
FIG. 5 is an annotated diagram illustrating inclusion of control codes in an upload spreadsheet generated by modification of the source spreadsheet, according to some example embodiments.

FIG. 5 is an annotated diagram illustrating inclusion of control codes 501, 502, 503, 504, 505, 506, 507, 508, 509, and 510 in an upload spreadsheet 500 generated by modification of the source spreadsheet 300, according to some example embodiments. The source spreadsheet 300 may be modified by the user 132, for example, by operating the device 130 to produce the upload spreadsheet 500. For example, the user 132 may edit the source spreadsheet 300 by adding one or more of the control codes 501-510. As used herein, the phrase "control code" refers to a code whose presence is usable to control (e.g., trigger) one or more behaviors of the database generation machine 110. A control code may be or include a tag, a string, or any other suitable combination of one or more alphanumeric characters (e.g., inserted into a particular cell of the source spreadsheet 300 to generate the upload spreadsheet 500). In some example embodiments, one or more the control codes 501-510 may be automatically inserted by a spreadsheet application (e.g., Microsoft® Excel®), which may be configured (e.g., by installation of one or more software modules, such as, plug-ins) to modify the source spreadsheet 300 by adding one or more the control codes 501-510. Thus, according to various example embodiments, generation of the upload spreadsheet 500 may be performed by the user 132 (e.g., in operating the spreadsheet application), by the device 130 (e.g., in executing the spreadsheet application, as modified by a plug-in), or by any suitable combination thereof.

As shown in FIG. 5, the upload spreadsheet 500 includes the control code 501 (e.g., "xOT-UPLOAD"), which may indicate that the upload spreadsheet 500 (e.g., this worksheet within the upload spreadsheet 500) is ready for conversion into the database 115 (e.g., ready to be parsed by the database generation machine 110 and used to generate the database 115).

As shown in FIG. 5, the upload spreadsheet 500 may include an additional column (e.g., titled "Owner"), which may appear as a new leftmost column compared to the unmodified source spreadsheet 300. This additional column may be labelled with the control code 502 (e.g., "Owner"), and the control code 502 may indicate that the column is a column of owner names. As used herein, an "owner name" is a name of a user (e.g., username of the user 132) that controls (e.g., owns) the one or more values of a row in a spreadsheet. For example, the owner name may be a user name, email address, or other identifier of the user 132, who may be logged in to the network-based system 105 and who may have modified the source spreadsheet 300 into the upload spreadsheet 500. As another example, the owner name may be a user name, email address, or other identifier of another user (e.g., user 152). In some example embodiments, this additional column may be omitted, and a default value (e.g., the username of a logged in user) for an owner name may be used when parsing the upload spreadsheet 500.

As shown in FIG. 5, the upload spreadsheet 500 may include the control code 503 (e.g., labeled "Catalog ID"), which may indicate that the values in the upload spreadsheet 500 are grouped into a particular catalog, which may be identified by a catalog identifier. As used herein, a "catalog" is a set of values and their corresponding variables (e.g., defined by at least their owner name and measure). A catalog may be included in other catalogs, for example, within a hierarchy of catalogs. Accordingly, one or more catalogs may be used (e.g., by the database generation machine 110, the users 132 and 152, or both) to conveniently refer to groups of values and their variables in bulk. A user (e.g., user 132) may create a new catalog by including the control code 503 in the upload spreadsheet 500. Moreover, the database generation machine 110 may offer one or more catalog management features that enable the user (e.g., user 132) to edit a catalog to contain one or more existing variables, one or more other catalogs, or any suitable combination thereof.

As shown in FIG. 5, the upload spreadsheet 500 includes the control code 504 (e.g., "Measure"), which may indicate that the column labeled by the control code 504 is a column of measures within the upload spreadsheet 500. In the example embodiments shown, the control code 504 has replaced the header cell labelled "Sales" in the source spreadsheet 300.

As shown in FIG. 5, the upload spreadsheet 500 may include the control code 505 (e.g., "Dim 1"), which may indicate that the column labeled by the control code 505 is a first column of dimensions (e.g., a column first dimensions) within the upload spreadsheet 500. In the example embodiments shown, the control code 505 has replaced the header cell labeled "Area" in the source spreadsheet 300.

As shown in FIG. 5, the upload spreadsheet 500 may include the control code 506 (e.g., "Dim 2"), which may indicate that the column labeled by the control code 506 is a second column of dimensions (e.g., a column of second dimensions) within the upload spreadsheet 500. In the example embodiments shown, the control code 506 has replaced the header cell labeled "Plan?" in the source spreadsheet 300.

As shown in FIG. 5, the upload spreadsheet 500 may include the control code 507 (e.g., "Att 1"), which may indicate that the column labeled by the control code 507 is a first column of attributes (e.g., a column of first attributes) within the upload spreadsheet 500. In the example embodiments shown, the control code 507 has replaced the header cell labeled "Audit?" in the source spreadsheet 300.

As shown in FIG. 5, the upload spreadsheet 500 may include the control code 508 (e.g., "Att 2"), which may indicate that the column labeled by the control code 508 is a second column of attributes (e.g., a column of second attributes) within the upload spreadsheet 500. In the example embodiments shown, the control code 508 has replaced the header cell labeled "Units" in the source spreadsheet 300.

As shown in FIG. 5, the upload spreadsheet 500 includes the control code 509 (e.g., "Time 1"), which may indicate that the column labeled by the control code 509 is a first column of values (e.g., a column of first values, at a first time, during a first time period, or within a first scenario) within the upload spreadsheet 500. In the example embodiments shown, the control code 509 has replaced the header cell labeled "Q1" in the source spreadsheet 300.

As shown in FIG. 5, the upload spreadsheet 500 may include the control code 510 (e.g., "Time 2"), which may indicate that the column labeled by the control code 510 is a second column of values (e.g., a column of second values, at a second time, during a second time period, or within a second scenario) within the upload spreadsheet 500. In the example embodiments shown, the control code 509 has replaced the header cell labeled "Q2" in the source spreadsheet 300.

As shown in FIG. 5, the upload spreadsheet 500 may include one or more rows. For example, the upload spreadsheet 500 may include a row (e.g., an upload row) that specifies at least an owner name (e.g., "john@1shop.com") for the row, a measure (e.g., "local sales") of the row, and a value (e.g., "1000") of the measure of the row. In addition, the row may specify one or more dimensions (e.g., "US" and "plan") of the row, one or more attributes (e.g., "yes" and "USD") of the row, and one or more further values (e.g., "1250") of the measure of the row.

Figure 6:
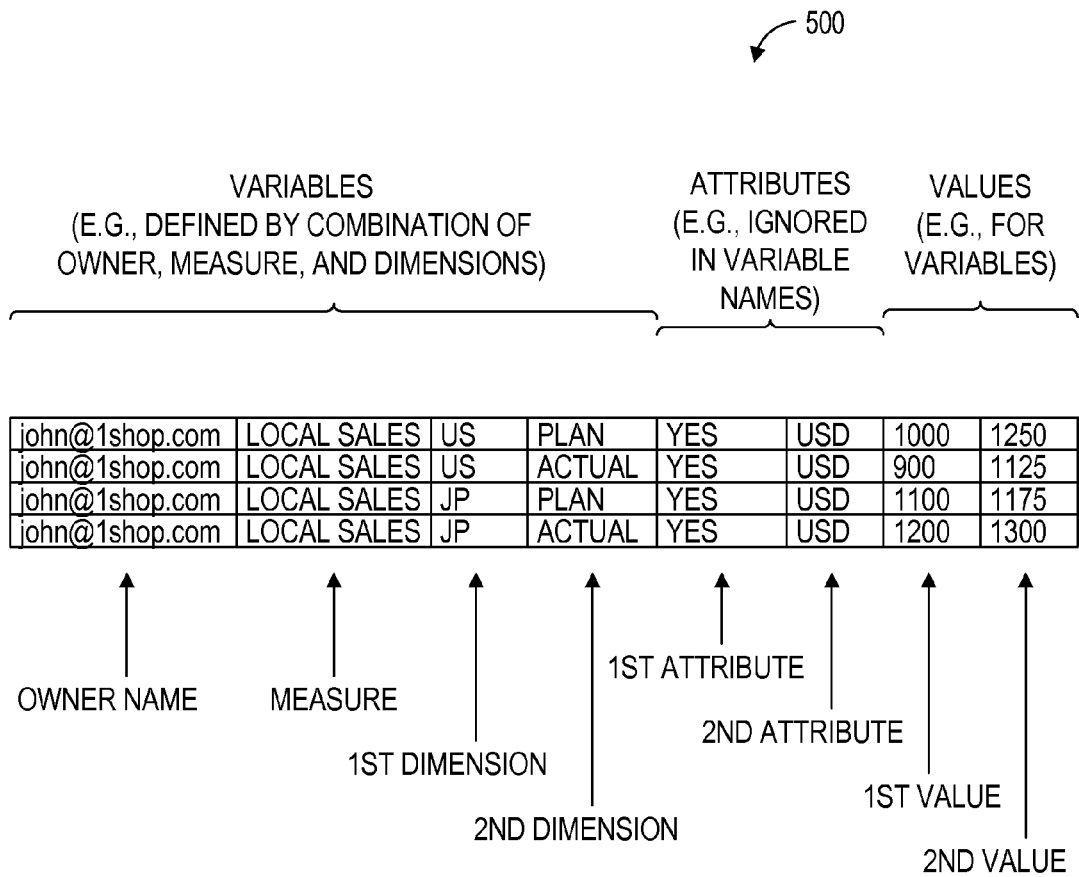
FIG. 6 is an annotated diagram illustrating variables, attributes, and values indicated by the upload spreadsheet, according to some example embodiments.

FIG. 6 is an annotated diagram illustrating variables, attributes, and values indicated by the upload spreadsheet 500, according to some example embodiments. The database generation machine 110 (e.g., via the parse module 220) may parse the upload spreadsheet 500 and generate (e.g., determine or define) a variable for each row in the upload spreadsheet 500. For any given row, its variable may be defined by its owner name and the measure, along with any dimensions that are indicated. For example, a variable for a row may be defined by a variable name that textually combines the row's owner name, the row's measure, and the row's dimensions. In other words, the variable name of a row may be or include a textual combination of the owner name, the measure, and any indicated dimensions for that row.

In some example embodiments, the variable for a row is defined only by its owner name and its measure. In other example embodiments, the variable for a row is defined by its owner name, its measure, and one or more of its dimensions. According to various example embodiments, attributes are ignored in defining a variable. However, the one or more values in a row remain correlated with the variable defined for that row.

Figure 7:
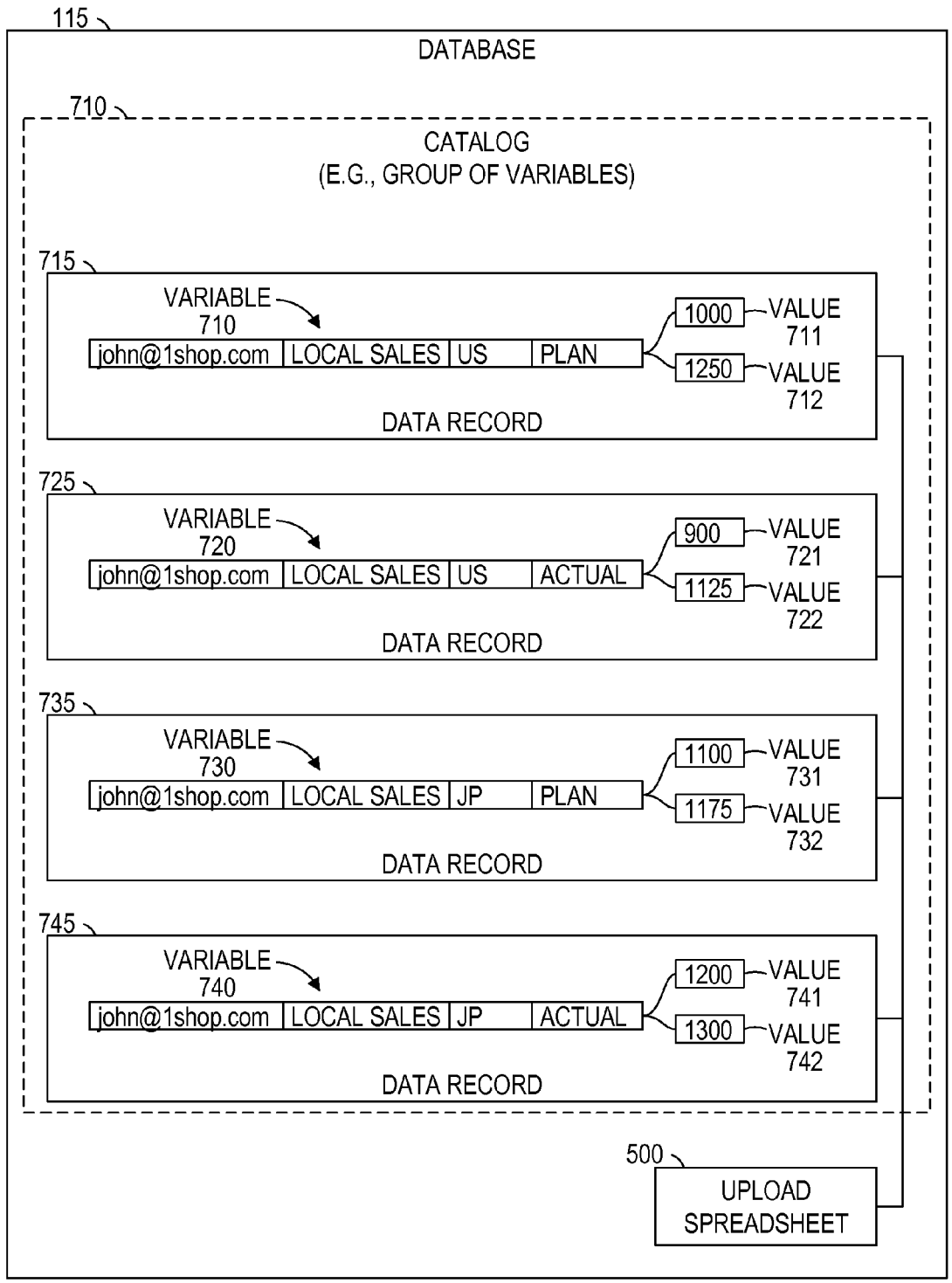
FIG. 7 is a block diagram of a database generated from the upload spreadsheet, according to some example embodiments.

FIG. 7 is a block diagram of the database 115, which may be generated (e.g., by the database generation machine 110, via the generation module 230) from the upload spreadsheet 500, according to some example embodiments. The database 115 may include data records 715, 725, 735, and 745 that respectively correspond to the rows of the upload spreadsheet 500.

As shown in FIG. 7, the data record 715 may include a variable 710, which may have a variable name defined based on (e.g., generated by inclusion of) the owner name (e.g., "john@1shop.com") for its row, the measure (e.g., "local sales") for its row, and the dimensions (e.g., "US" and "plan") for its row. In addition, the data record 715 may include the corresponding values 711 (e.g., "1000") and 712 (e.g., "1250") for its row. Hence, the data record 715 may correlate (e.g., pair, link, or map) the variable 710 with its values 711 and 712. Moreover, the database 115 may include the data record 715—with its included variable 710 and values 711 and 712—within a catalog 710, which may group the data records 715, 725, 735, and 745 together (e.g., for convenient reference). Furthermore, the database 115 may store the upload spreadsheet 500 and correlate (e.g., by reference) the data record 715 with the upload spreadsheet 500.

As shown in FIG. 7, the data record 725 may include a variable 720, which may have a variable name defined based on the owner name (e.g., "john@1shop.com") for its row, the measure (e.g., "local sales") for its row, and the dimensions (e.g., "US" and "actual") for its row. In addition, the data record 725 may include the corresponding values 721 (e.g., "900") and 722 (e.g., "1125") for its row. Hence, the data record 725 may correlate the variable 720 with its values 721 and 722. Moreover, the database 115 may include the data record 725—with its included variable 720 and values 721 and 722—within the catalog 710.

Furthermore, the database 115 may correlate the data record 725 with the upload spreadsheet 500.

As shown in FIG. 7, the data record 735 may include a variable 730, which may have a variable name defined based on the owner name (e.g., "john@1shop.com") for its row, the measure (e.g., "local sales") for its row, and the dimensions (e.g., "JP" and "plan") for its row. In addition, the data record 735 may include the corresponding values 731 (e.g., "1100") and 732 (e.g., "1175") for its row. Hence, the data record 735 may correlate the variable 730 with its values 731 and 732. Moreover, the database 115 may include the data record 735—with its included variable 730 and values 731 and 732—within the catalog 710. Furthermore, the database 115 may correlate the data record 735 with the upload spreadsheet 500.

As shown in FIG. 7, the data record 745 may include a variable 740, which may have a variable name defined based on the owner name (e.g., "john@1shop.com") for its row, the measure (e.g., "local sales") for its row, and the dimensions (e.g., "JP" and "actual") for its row. In addition, the data record 745 may include the corresponding values 741 (e.g., "1200") and 742 (e.g., "1300") for its row. Hence, the data record 745 may correlate the variable 740 with its values 741 and 742. Moreover, the database 115 may include the data record 745—with its included variable 740 and values 741 and 742—within the catalog 710. Furthermore, the database 115 may correlate the data record 745 with the upload spreadsheet 500.

Figure 8:
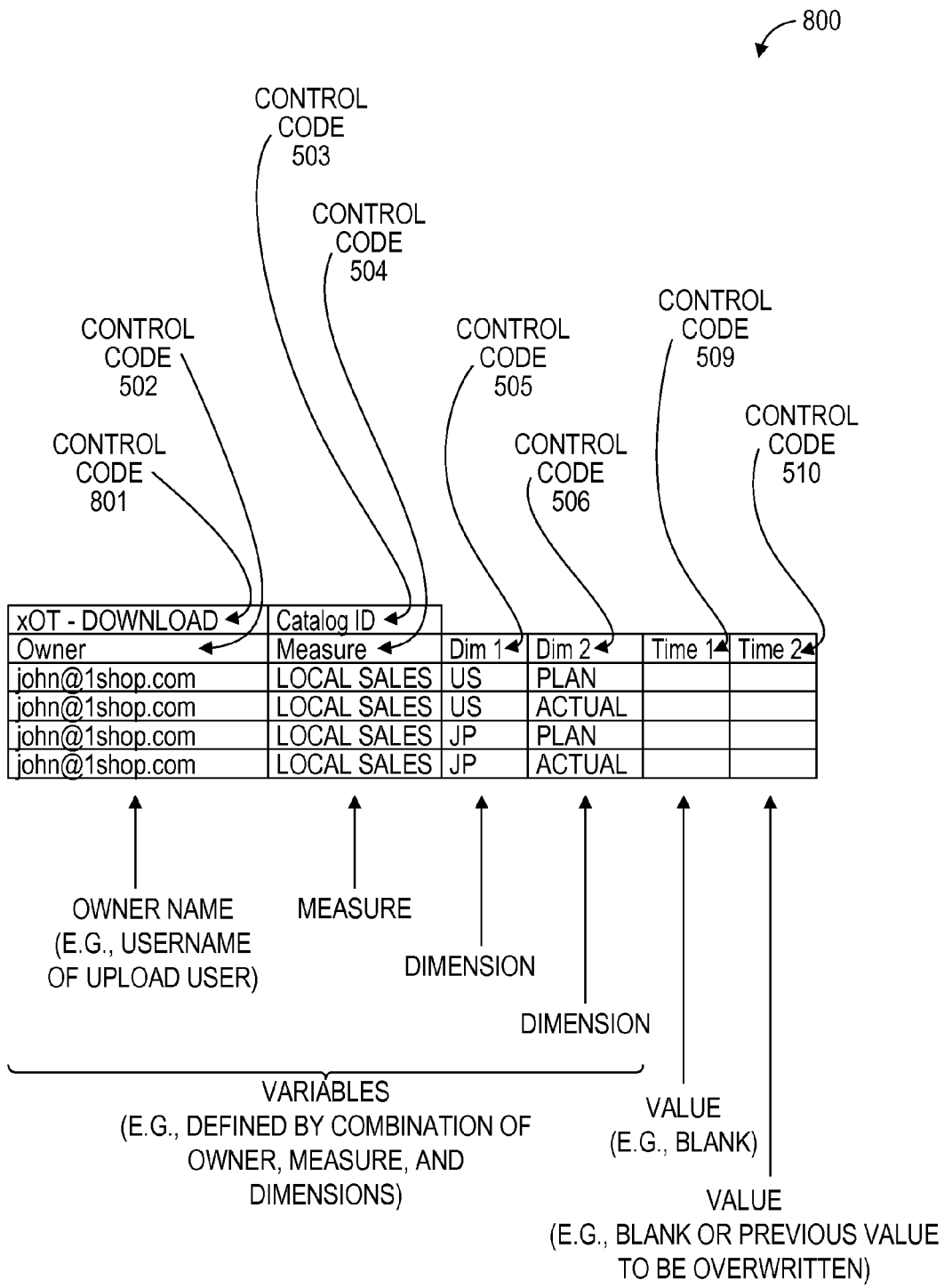
FIG. 8 is an annotated diagram of a download spreadsheet that has blank values and is ready to be modified into an output spreadsheet, according to some example embodiments.

FIG. 8 is an annotated diagram of a download spreadsheet 800 that has blank values (e.g., instead of the values 711, 712, 721, 722, 731, 732, 741, and 742) and is ready to be modified into an output spreadsheet, according to some example embodiments. FIG. 8 illustrates inclusion of a control code 801, as well as the control codes 502, 503, 504, 505, 506, 509, and 510 in the download spreadsheet 800. The control code 801 (e.g., "xOT-DOWNLOAD") may indicate that the download spreadsheet 800 (e.g., this worksheet within the download spreadsheet 800) is ready for receiving information from the database 115 (e.g., ready to incorporate and present one or more values retrieved from the database 115). The control codes 502, 503, 504, 505, 506, 509, and 510, when present in the download spreadsheet 800, may function as described above with respect to FIG. 5.

The download spreadsheet 800 may be generated by the user 152, for example, by operating the device 150 to produce the download spreadsheet 800 (e.g., as all or part of a query of the database 115). In some example embodiments, however, one or more of the control codes 801 and 502, 503, 504, 505, 506, 509, and 510 may be automatically inserted by a spreadsheet application (e.g., Microsoft® Excel®), which may be configured (e.g., by installation of one or more software modules, such as, a plug-in) to create the download spreadsheet 800 (e.g., as all or part of a query of the database 115). Thus, according to various example embodiments, generation of the download spreadsheet 800 may be performed by the user 152 (e.g., in operating the spreadsheet application), by the device 150 (e.g., in executing the spreadsheet application, as modified by a plug-in), or by any suitable combination thereof.

The download spreadsheet 800 may be utilized to query the database 115 for values of one or more variables, which may be specified by variable name (e.g., "john@1shop.com, local sales, US, plan" for the variable 710) or by catalog (e.g., "Catalog ID" for the control code 503 that indicates the catalog 710). As shown in FIG. 8, the download spreadsheet 800 may include one or more empty (e.g., blank) value cells for receiving data as a result of a query. In some example embodiments, the download spreadsheet 800 may include one or more pre-populated (e.g., nonempty) value cells which may be overwritten after receiving data as result of a query. As an example, the user 152 may query the database 115 for the values 711, 712, 721, 722, 731, 732, 741, and 742 of the variables 715, 725, 735, and 745, and such a query may be initiated by generating the download spreadsheet 800 and requesting that the database generation machine 110, the database 115, or any suitable combination thereof, fill in the empty value cells by providing the values 711, 712, 721, 722, 731, 732, 741, and 742. In certain example embodiments, the device 150 is configured (e.g., by the spreadsheet application, as modified by a plug-in) to modify the download spreadsheet 800 into an output spreadsheet that includes the provided values 711, 712, 721, 722, 731, 732, 741, and 742 (e.g., but otherwise appears like the download spreadsheet 800). The device 150 may then present such an output spreadsheet to the user 152 as a result of the query.

In alternative example embodiments, the user 152 may submit such a query by specifying the catalog 710 (e.g., by specifying the control code 503), and the device 150 may be configured (e.g., by the spreadsheet application, as modified by a plug-in) to generate the download spreadsheet 800 based on the specified catalog 710 and request that the database generation machine 110, the database 115, or any suitable combination thereof, fill in the empty value cells as described above. As noted above, the device 150 may be configured to modify the download spreadsheet 800 into an output spreadsheet that includes the provided values 711, 712, 721, 722, 731, 732, 741, and 742, and the device 150 may then present such an output spreadsheet to the user 152 as a result of the query. In some example embodiments, the query may be made by specifying the catalog 710 and one or more filtering criteria to generate a subset of the download spreadsheet 800 based on the filtering criteria.

Figure 9:
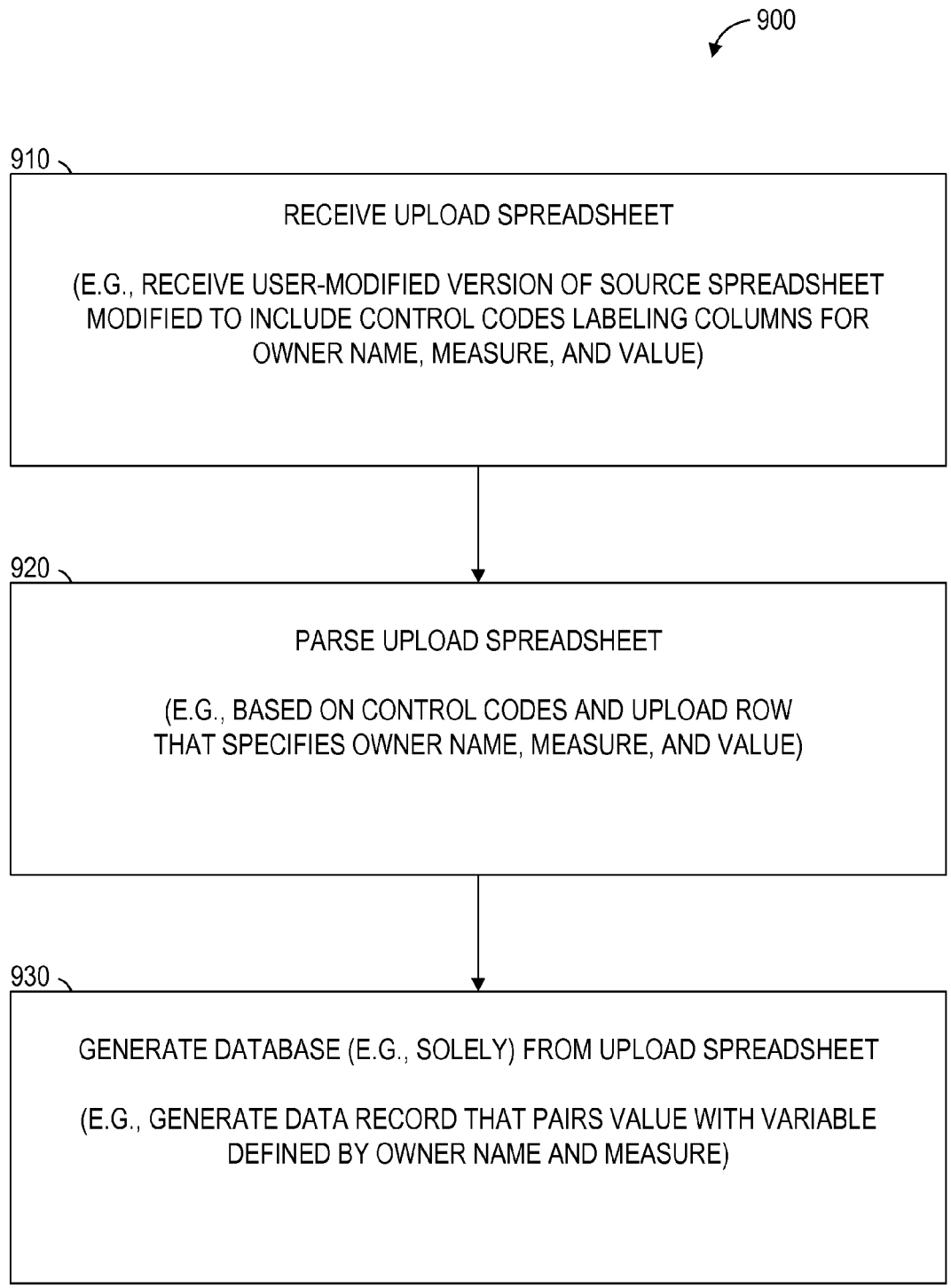
FIGS. 9-12 are flowcharts illustrating operations of the database generation machine in performing a method of database generation from the upload spreadsheet, according to some example embodiments.

FIGS. 9-12 are flowcharts illustrating operations of the database generation machine 110 in performing a method 900 of generating the database 115 based on the upload spreadsheet 500, according to some example embodiments. Operations in the method 900 may be performed by the database generation machine 110, using the modules described above with respect to FIG. 2. As shown in FIG. 9, the method 900 includes operations 910, 920, and 930.

In operation 910, the upload module 210 receives the upload spreadsheet 500. As noted above, the upload spreadsheet 500 may be a user-modified version of the source spreadsheet 300, for example, modified to include one or more of the control codes 501-510. In some example embodiments, the upload spreadsheet 500 includes at least the control code 502 (e.g., a first control code that labels a column for owner names), the control code 504 (e.g., a second control code that labels a column of measures), and the control code 509 (e.g., a third control code that labels a column of values of measures). As noted above, the upload spreadsheet 500 may include a row (e.g., an upload row) that specifies at least an owner name (e.g., "john@1shop.com") for the row, a measure (e.g., "local sales") of the row, and a value (e.g., "1000," for the value 711) of the measure of the row. In some example embodiments, the row and the control codes 502, 504, and 509 (e.g., the first, second, and third control codes) all appear together on a single worksheet among multiple worksheets in the upload spreadsheet 500. In certain example embodiments, such a worksheet may also include a catalog name that identifies a catalog (e.g., catalog 710) to which the row and its data (e.g., the variable 710 and its values 711 and 712) belong. The upload spreadsheet 500 may be received from the device 130. In alternative example embodiments, the upload spreadsheet 500 may be received from a third-party server (e.g., a cloud-based system) in response to an authorization by the user 132.

In operation 920, the parse module 220 parses the upload spreadsheet 500 received in operation 910. The parsing of the upload spreadsheet 500 may be based on the control code 502 (e.g., the first control code), the control code 504 (e.g., the second control code), the control code 509 (e.g., the third control code), or any suitable combination thereof. Also, the parsing of the upload spreadsheet 500 based on the control code 502 may result in identifying the owner name of the row (e.g., "john@1shop.com"). Moreover, the parsing of the upload spreadsheet 500 based on the control code 504 may result in identifying the measure of the row (e.g., "local sales"). Furthermore, the parsing of the upload spreadsheet 500 based on the control code 509 may result in identifying the value of the measure of the row (e.g., "1000," for the value 711).

In operation 930, the generation module 230 generates the database 115. As noted above, the database 115 may include the data record 715 in which the value 711 (e.g., "1000") quantifies the variable 710 whose name (e.g., a variable name, such as, "john@1shop.com, local sales" or a longer text string) includes the owner name of the row (e.g., "john@1shop.com") and the measure of the row (e.g., "local sales"). The generating of the database 115 may be performed based on the row (e.g., the upload row) that specifies the owner name (e.g., "john@1shop.com") for the row, the measure (e.g., "local sales") of the row, and the value (e.g., "1000," for the value 711) of the measure of the row. The generating of the database 115 may be further based on the control code 502 (e.g., the first control code), the control code 504 (e.g., the second control code), the control code 509 (e.g., the third control code), or any suitable combination thereof.

In some example embodiments, operation 930 generates the database 115 solely from the upload spreadsheet 500 (e.g., without any other input received from the user 132 or the device 130). In certain example embodiments, operation 930 includes generating one or more of the data records 715, 725, 735, and 745, for inclusion in the database 115 (e.g., grouped into the catalog 710 based on the control code 503, if present in the upload spreadsheet 500). Moreover, the database 115 may track (e.g., as stored metadata of the database 115) which data came from which upload spreadsheet (e.g., upload spreadsheet 500), as well as version tracking information (e.g., version numbers or timestamps assigned to values of variables).

The method 900 may also be applied to adding (e.g., appending) data to existing variables. For example, a further iteration of the operations 910, 920, and 930 may parse the upload spreadsheet 500 using the control code 510 (e.g., as the third control code), in lieu of the control code 509. Furthermore, one or more values, one or more attributes (e.g., entries for attributes), or any suitable combination thereof may be versioned, such that performance of the method 900 results in the tracking of versions (e.g., timestamps or sequential version numbers) for that value or attribute within the database 115.

Figure 10:
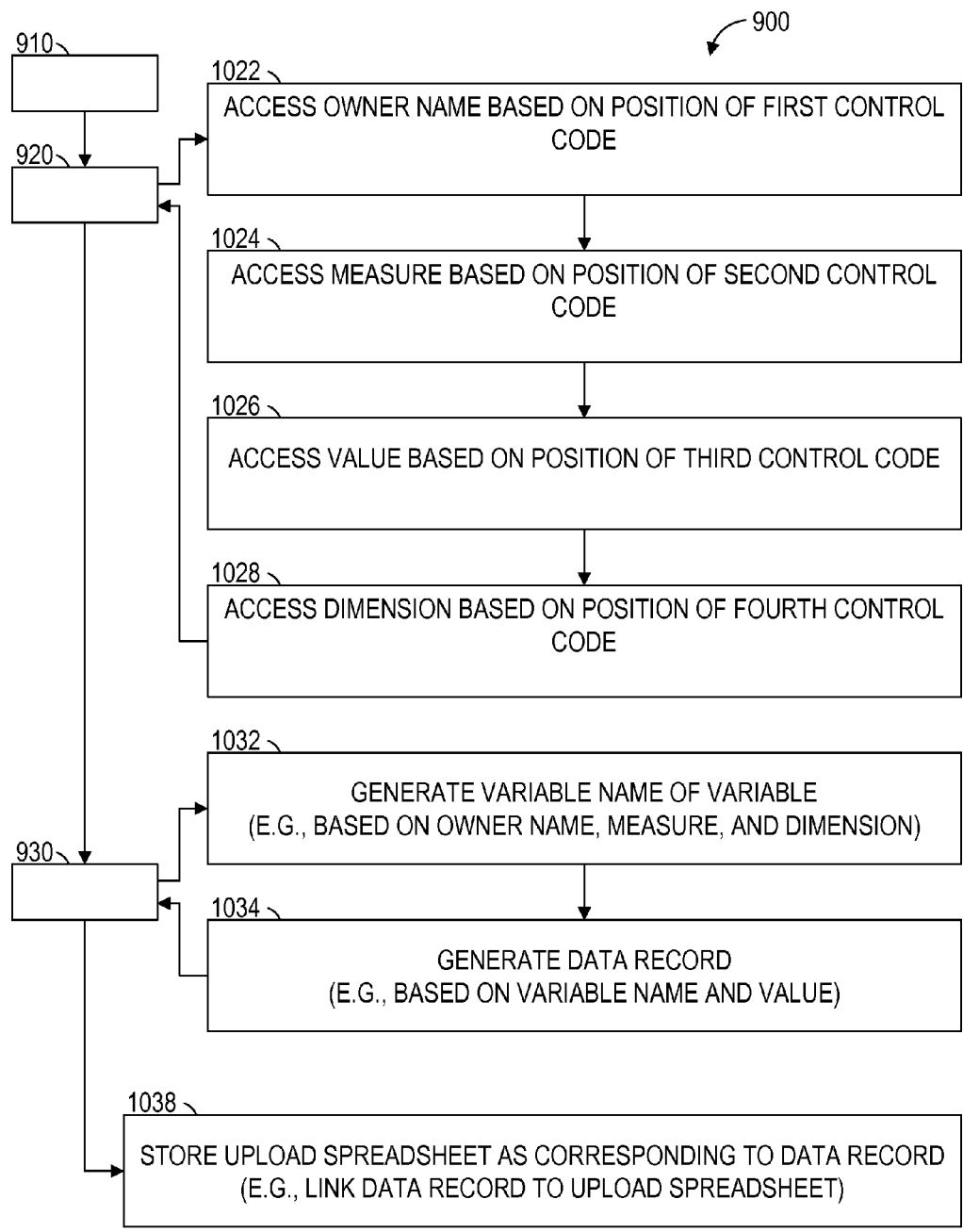

As shown in FIG. 10, the method 900 may include one or more of operations 1022, 1024, 1026, 1028, 1032, 1034, and 1038. One or more of operations 1022-1028 may be performed as part (e.g., a precursor task, a subroutine, or a portion) of operation 920, in which the parse module 220 parses the upload spreadsheet 500.

In operation 1022, the parse module 220 accesses the owner name for the row (e.g., the upload row) based on a position of the control code 502 (e.g., the first control code) within the upload spreadsheet 500. For example, the control code 502 may occupy a particular cell (e.g., a first cell, addressed or identified by a particular row and a particular column) in the upload spreadsheet 500, and the parse module 220 may access the owner name (e.g., "john@1shop.com") by accessing that particular cell of the upload spreadsheet 500. In some example embodiments, the parse module 220 may be configured to check the particular cell for presence of the control code 502 and, if the control code 502 is present there, access the owner name based on (e.g., in response to) the presence of the control code 502 in the particular cell. In example embodiments that contain operation 1022, the generating (e.g., generation) of the database 115 in operation 930 may be based on the owner name accessed in operation 1022. For example, the generating of the database 115 in operation 930 may include generating a name (e.g., a variable name) of the variable 710 based on (e.g., by inclusion or incorporation of) the accessed owner name. According to some example embodiments, the parse module 220 accesses the owner name by accessing a default owner name (e.g., a username of the user 132, who may be a currently logged in user).

In operation 1024, the parse module 220 accesses the measure for the row (e.g., the upload row) based on a position of the control code 504 (e.g., the second control code) within the upload spreadsheet 500. For example, the control code 504 may occupy a particular cell (e.g., a second cell, addressed or identified by a particular row and the particular column) in the upload spreadsheet 500, and the parse module 220 may access the measure (e.g., "local sales") by accessing that particular cell of the upload spreadsheet 500. In some example embodiments, the parse module 220 may be configured to check the particular cell for presence of the control code 504 and, if the control code 504 is present there, access the measure based on (e.g., in response to) the presence of the control code 504 in the particular cell. In example embodiments that contain operation 1024, the generating of the database 115 in operation 930 may be based on the measure accessed in operation 1024. For example, the generating of the database 115 in operation 930 may include generating a name (e.g., a variable name) of the variable 710 based on (e.g., by inclusion or incorporation of) the accessed measure. According to certain example embodiments, the combination of the owner name and the measure is unique within the upload spreadsheet 500, and the generated name of the variable 710 is unique among all other variable names for other variables (e.g., variables 720, 730, and 740) generated from the upload spreadsheet 500.

In operation 1026, the parse module 220 accesses the value (e.g., value 711) of the measure for the row (e.g., the upload row) based on a position of the control code 509 (e.g., the third control code) within the upload spreadsheet 500. For example, the control code 509 may occupy a particular cell (e.g., a third cell, addressed or identified by a particular row and a particular column) in the upload spreadsheet 500, and the parse module 220 may access the value (e.g., "1000," for the value 711) by accessing that particular cell of the upload spreadsheet 500. In some example embodiments, the parse module 220 may be configured to check the particular cell for presence of the control code 509 and, if the control code 509 is present there, access the value of the measure based on (e.g., in response to) the presence of the control code 504 in the particular cell. In example embodiments that contain operation 1026, the generating of the database 115 in operation 930 may be based on the value accessed in operation 1026. For example, the generating of the database 115 in operation 930 may include generating the data record 715 based on the accessed value and based on (e.g., by inclusion or incorporation of) a name of the variable 710, which corresponds to the accessed value.

In operation 1028, the parse module 220 accesses a dimension of the row (e.g., the upload row) based on a position of the control code 505 (e.g., a fourth control code) within the upload spreadsheet 500. For example, the control code 505 may occupy a particular cell (e.g., a fourth cell, addressed or identified by a particular row and a particular column) in the upload spreadsheet 500, and the parse module 220 may access the dimension (e.g., "US") by accessing that particular cell of the upload spreadsheet 500. In some example embodiments, the parse module 220 may be configured to check the particular cell for presence of the control code 505 and, if the control code 505 is present there, access the dimension based on (e.g., in response to) the presence of the control code 505 in the particular cell. In example embodiments that contain operation 1028, the generating of the database 115 in operation 930 may be based on the value accessed in operation 1028. For example, the generating of the database 115 in operation 930 may include generating a name (e.g., a variable name) of the variable 710 based on (e.g., by inclusion or incorporation of) the accessed dimension. According to certain example embodiments, the combination of the owner name, the measure, and the dimension is unique within the upload spreadsheet 500, and the generated name of the variable 710 is unique among all other variable names for other variables (e.g., variables 720, 730, and 740) generated from the upload spreadsheet 500. Hence, a variable (e.g., variable 710) generated based on an owner, a measure, and a dimension (e.g., an entry for its dimension) is different from a variable generated without the dimension based on the owner and the measure.

One or more of operations 1032 and 1034 may be performed as part of operation 930, in which the generation module 230 generates the database 115. In operation 1032, the generation module 230 generates the name (e.g., variable name) of the variable 710. For example, the name may be generated as a text string that includes or incorporates the corresponding owner name (e.g., "john@1shop.com"), the corresponding measure (e.g., "local sales"), and any corresponding dimensions (e.g., "US" and "plan").

In operation 1034, the generation module 230 generates the data record 715 for inclusion in the database 115. The generation of the data record 715 may be based on the name of the variable 710 (e.g., as generated in operation 1032) and based on the value (e.g., value 711, as accessed in operation 1026). Operation 1034 may be repeated to generate additional data records (e.g., data records 725, 735, and 745) to populate the database 115.

Operation 1038 may be performed at any point after the generation of the data record 715 in operation 1034, which may be performed as part of operation 930. In operation 1038, the generation module 230 stores the upload spreadsheet 500 with the database 115 (e.g., in the database 115, as illustrated in FIG. 7). As discussed above, the stored upload spreadsheet 500 may correspond to the data record 715, in which the value 711 quantifies the variable 710, whose name may include the owner name for the corresponding row (e.g., upload row) and the measure of the corresponding row.

Figure 11:
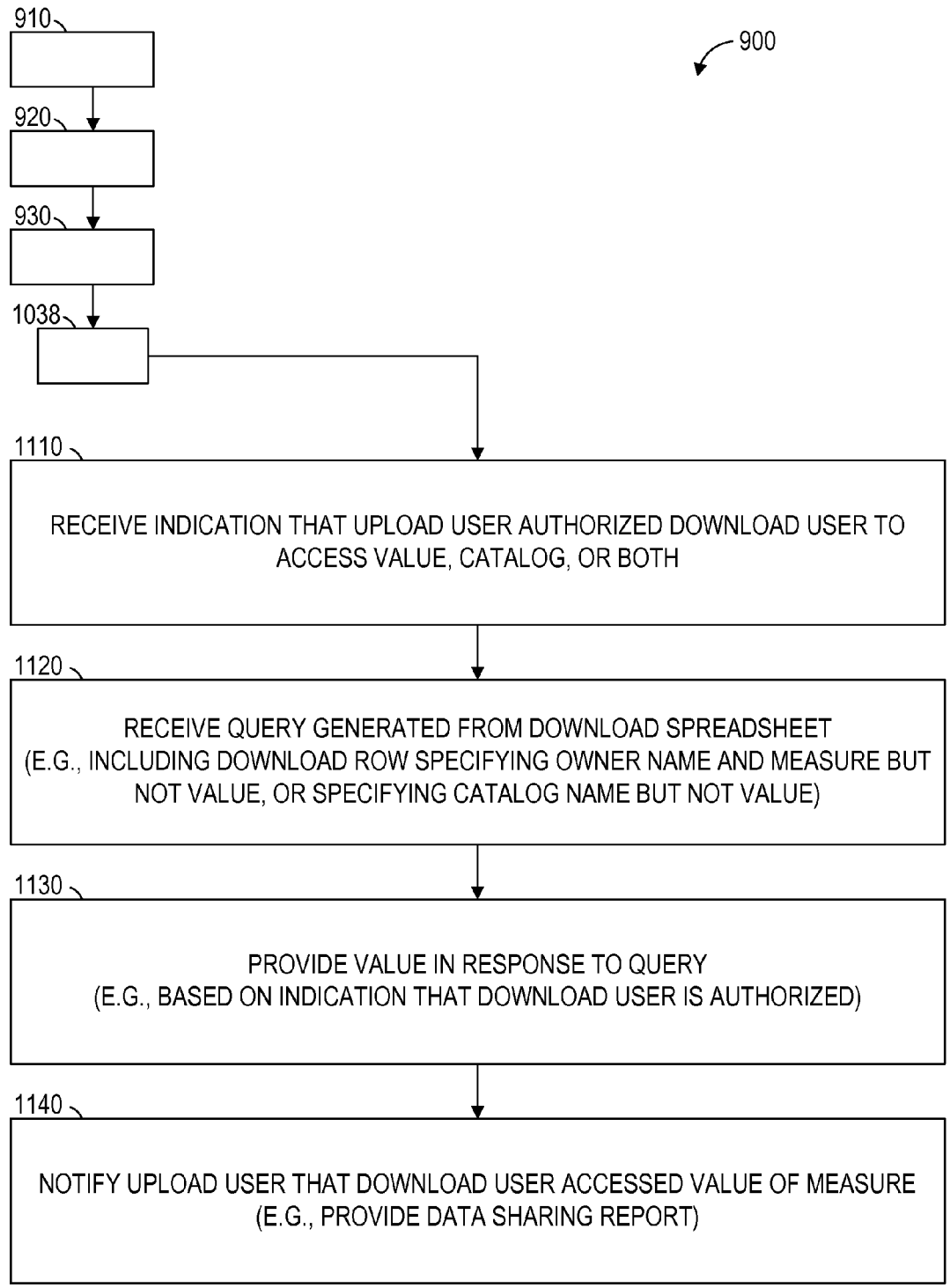

As shown in FIG. 11, the method 900 may include one or more of operations 1110, 1120, 1130, and 1140, which may be performed after operation 930. In operation 1110, the share module 250 receives an indication that the user 132 (e.g., an upload user) authorized the user 152 (e.g., a download user) to access the value 711 of the variable 710. For example, the share module 250 may receive a request from the user 132 (e.g., sent from the device 130) that the user 152 be allowed to access the value 711. As another example, the share module 250 may receive a request from the user 132 that the user 152 be allowed access the catalog 710, which includes the value 711. As a further example, the share module 250 may receive a request from the user 132 that the user 152 be allowed to access all information owned or originated by the user 132. As a further example, the share module 250 may receive or access a set of preferences (e.g., stored in the network-based system 105) for the user 132, and the set of preferences may authorize the user 152 to access the value 711, the catalog 710, all information owned or originated by the user 132, or any suitable combination thereof.

In operation 1120, the query module 240 receives a query from the device 150 (e.g., a download device, in contrast with the device 130, which may be an upload device) of the user 152 (e.g., the download user). The query may be generated from the download spreadsheet 800. For example, the query may be or include the download spreadsheet 800. In some example embodiments, the download spreadsheet 800 includes a row (e.g., a download row) that specifies an owner name (e.g., "john@1shop.com") of the row and the measure (e.g., "local sales") of the row but does not specify a value (e.g., has at least one empty value cell) of the measure of the row. In alternative example embodiments, the download spreadsheet 800 includes a row (e.g., a download row) that specifies a catalog name (e.g., a name or other identifier of the catalog 710) of a catalog (e.g., catalog 710) but does not specify a value of a variable (e.g., variable 710) included in the catalog. According to certain example embodiments, the combination of the owner name and the measure is unique within the download spreadsheet 800.

In operation 1130, the query module 240 accesses the database 115 and, in response to the query received in operation 1120, provides at least the value 711 to the device 150 (e.g., the download device) from which the query was received. The providing of the value 711 may be based on the indication (e.g., received in operation 1110) that the user 152 (e.g., the download user) is authorized to access the value 711, access the catalog 710, access information owned or originated by the user 132, or any suitable combination thereof. This may cause the device 150 (e.g., as configured by a spreadsheet application, which may itself be configured or modified by one or more plug-ins) to modify the download spreadsheet 800 into an output spreadsheet by inclusion of the value 711 within the row (e.g., download row) that specifies the owner name that corresponds to the value 711, the measure that corresponds the value 711, or both. Thus, such an output spreadsheet may be presented by the device 150 to the user 152 as a result (e.g., search result) returned by the query. In some example embodiments, such an output spreadsheet may be communicated to a third-party server (e.g., a cloud-based system from which the upload spreadsheet 500 was received in operation 910) for subsequent presentation to the user 152.

In operation 1140, the share module 250 notifies the user 132 (e.g., the upload user) that the user 152 (e.g., the download user) accessed the value 711. For example, the share module 250 may provide a data sharing report to the device 130, and the data sharing report may indicate that the user 152 retrieved the value 711 by executing the query discussed above with respect to operations 1120 and 1130. This may have the effect of helping the user 132 (e.g., as owner or originator of the information contained in the variable 710 and its corresponding value 711) monitor who is using his data. In certain example embodiments, if the user 132 (e.g., the upload user) subsequently updates the upload spreadsheet 500 such that the value 711 changes to a new value, the share module 250 may notify the user 152 (e.g., the download user) that there has been an update to the value 711 (e.g., as a value previously accessed by the user 152).

Figure 12:
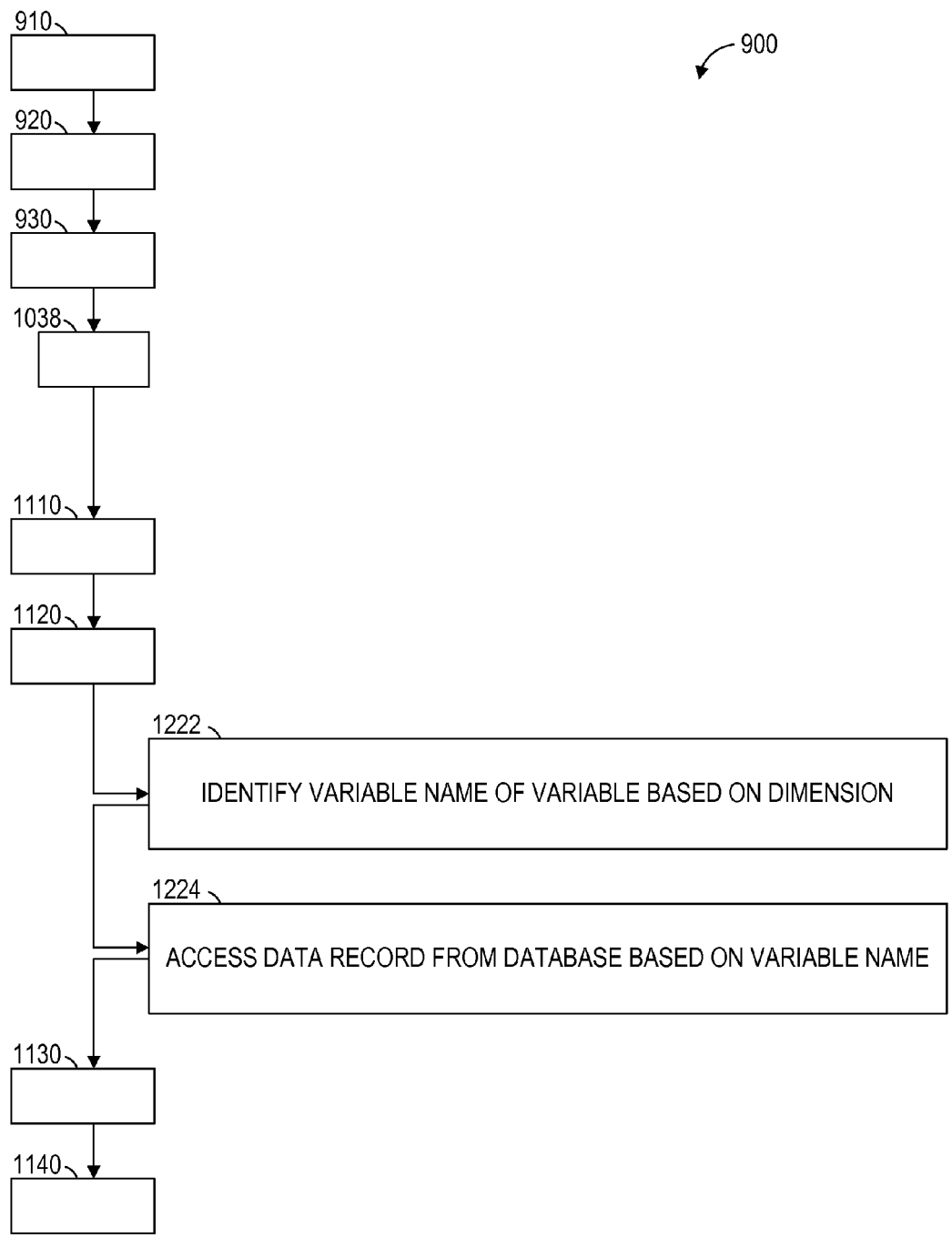

According to some example embodiments, the download spreadsheet 800 specifies one or more dimensions (e.g., by inclusion of one or both of the control codes 505 and 506, as shown in FIG. 8). For example, the download spreadsheet 800 may include the control code 505 (e.g., a fourth control code), which may label a dimension (e.g., "US") of the row (e.g., download row). Moreover, the combination of the owner name (e.g., "john@1shop.com") of the row, the measure (e.g., "local sales") of the row, and the dimension (e.g., "US") of the row may be unique within the download spreadsheet 800. In such situations, as shown in FIG. 12, the method 900 may include one or both of operations 1222 and 1224, which may be performed between operations 1120 and 1130.

In operation 1222, the query module 240 identifies the variable 710 (e.g., by its name) based on the dimension (e.g., "US") specified by the row (e.g., download row). For example, the dimension may be included in the name (e.g., variable name) of the variable 710, and the query module 240 may identify the variable 710 by detecting the dimension within the name of the variable 710.

In operation 1224, the query module 240 accesses the data record 715 based on the name (e.g., variable name) of the variable 710 identified in operation 1222. For example, the query module 240 may access the database 115 (e.g., by querying it) and retrieve the data record 715, which may be indexed by the names of variables stored therein (e.g., variables 710, 720, 730, 740). In some example embodiments, operation 1224 is performed as part of operation 1130. Performance of operations 1222 and 1224 may have the effect of retrieving and providing the value 711 based on the dimension (e.g., "US") specified by the row (e.g., download row). In situations where additional dimensions (e.g., a second dimension, a third dimension, or more) are specified in the upload spreadsheet 500 and the download spreadsheet 800, operations 1222 and 1224 may be repeated to handle those additional dimensions.

According to various example embodiments, one or more of the methodologies described herein may facilitate generation of a database (e.g., a database 115) from a spreadsheet (e.g., upload spreadsheet 500). Moreover, one or more of the methodologies described herein may facilitate query and retrieval of information from such a database (e.g., database 115) and presentation of such information in one or more output spreadsheets (e.g., generated by modifying the download spreadsheet 800). Hence, one or more of the methodologies described herein may facilitate enhanced storage, retrieval, management, and tracking of information owned or originated by one or more users (e.g., users 132 and 152). Moreover, the systems and methodologies discussed herein may enable users to store periodic, ever-growing data in a database (e.g., database 115) and hence avoid accumulating unwieldy numbers or sizes of spreadsheets. Furthermore, such a database (e.g., database 115) may be better suited than a spreadsheet to support analysis of data (e.g., variable 710) over time.

When these effects are considered in aggregate, one or more of the methodologies described herein may obviate a need for certain efforts or resources that otherwise would be involved in providing such enhanced storage, retrieval, management, and tracking capabilities. Efforts expended by one or more users in collaboratively working on one or more spreadsheets may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 13:
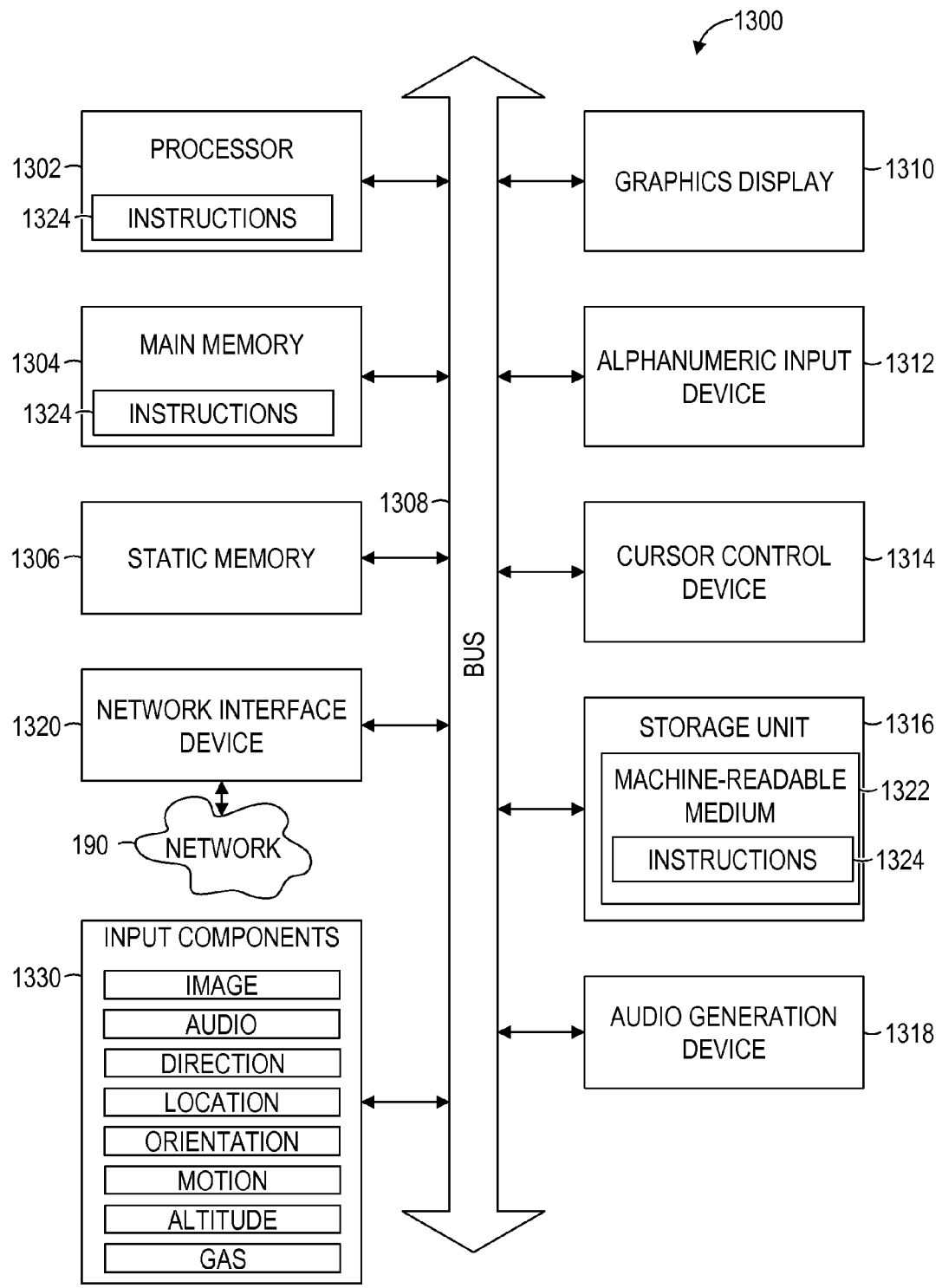
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a machine-readable storage medium, a computer-readable storage medium, or any suitable combination thereof) and perform any one or more of the methodologies discussed herein, in whole or in part. Specifically, FIG. 13 shows the machine 1300 in the example form of a computer system within which the instructions 1324 (e.g., software, a program, an application, an applet, an app, or other executable code) for causing the machine 1300 to perform any one or more of the methodologies discussed herein may be executed, in whole or in part. In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone or tablet computer, and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Regarding the spreadsheets discussed herein (e.g., upload spreadsheet 500 and download spreadsheet 800), any feature described with respect to a row may be similarly implemented with respect to the column, and vice versa, according to various example embodiments.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
receiving an upload spreadsheet generated by modification of a source spreadsheet to include a first control code that labels a column of owner names, include a second control code that labels a column of measures, and include a third control code that labels a column of values of measures;
parsing the received upload spreadsheet based on the first, second, and third control codes, the received upload spreadsheet including an upload row that specifies an owner name for the upload row, a measure of the upload row, and a value of the measure; and
generating a database that contains a data record in which the value of the measure quantifies a variable whose variable name includes the owner name of the upload row and the measure of the upload row,
the generating of the database being performed by a processor of a machine based on the upload row and on the first, second, and third control codes parsed from the received upload spreadsheet.

2. The method of claim 1, wherein:
the parsing of the received upload spreadsheet includes accessing the owner name for the upload row based on a position of the first control code within the upload spreadsheet; and
the generating of the database includes generating the variable name of the variable based on the accessed owner name.

3. The method of claim 1, wherein:
the parsing of the received upload spreadsheet includes accessing the measure of the upload row based on a position of the second control code within the upload spreadsheet; and
the generating of the database includes generating the variable name of the variable based on the accessed measure.

4. The method of claim 1, wherein:
the parsing of the received upload spreadsheet includes accessing the value of the measure based on a position of the third control code within the upload spreadsheet; and
the generating of the database includes generating the data record based on the variable name and the accessed value.

5. The method of claim 1, wherein:
the owner name for the upload row includes a username of a user;
the measure of the upload row includes a description of what is quantified by the value; and
the value of the measure quantifies the measure.

6. The method of claim 1, wherein:
the measure of the upload row includes a first description of what is quantified by the value;
the upload spreadsheet includes a fourth control code that labels a dimension of the measure, the dimension including a second description of what is quantified by the value;
the upload row specifies the dimension of the measure;
a combination of the owner name, the measure, and the dimension is unique within the upload spreadsheet; and
the generating of the database includes generating the variable name of the variable based on the dimension.

7. The method of claim 1, wherein:
the upload row and the first, second, and third control codes appear together on a worksheet among multiple worksheets of the upload spreadsheet; and
the worksheet includes a catalog name that identifies a catalog to which the variable belongs.

8. The method of claim 1, wherein:
the receiving of the upload spreadsheet is from an upload device of an upload user; and the method further comprises:
receiving a query from a download device of a download user, the query being generated from a download spreadsheet that labels a column of owner names with the first control code and labels a column of values with the third control code, the download spreadsheet including a download row that specifies the owner name but does not specify the value of the measure; and
providing the value that quantifies the variable to the download device in response to the query, the download device modifying the download spreadsheet into an output spreadsheet by inclusion of the value within the download row that specifies the owner name.

9. The method of claim 8, wherein:
the download spreadsheet labels a column of measures with the second control code;
the download row specifies the measure; and the output spreadsheet includes the value within the download row that specifies the measure.

10. The method of claim 8, wherein:
the providing of the value to the download device of the download user is based on an indication that the upload user authorized the download user to access the value; and the method further comprises
receiving the indication from the upload user.

11. The method of claim 8, wherein:
the measure of the download row includes a first description of what is quantified by the value;
the download spreadsheet includes a fourth control code that labels a dimension of the measure, the dimension including a second description of what is quantified by the value;
the download row specifies a dimension of the measure;
a combination of the owner name, the measure, and the dimension is unique within the download spreadsheet; and the method further comprises
identifying the variable name of the variable based on the dimension; and
accessing the data record from the generated database based on the identified variable name.

12. The method of claim 8 further comprising:
in response to the providing of the value to the download device, notifying the upload user that the download user accessed the value of the measure.

13. The method of claim 1, wherein:
the upload row and the first, second, and third control codes appear together on a worksheet among multiple worksheets of the upload spreadsheet;
the worksheet includes a catalog name that identifies a catalog to which the variable belongs;
the receiving of the upload spreadsheet is from an upload device of an upload user; and the method further comprises:
receiving a query from a download device of a download user, the query being generated from a download spreadsheet that specifies the catalog name but does not specify the value of the measure; and
providing the value that quantifies the variable to the download device in response to the query, the download device modifying the download spreadsheet into an output spreadsheet by inclusion of the value within a download row that specifies the measure.

14. The method of claim 13, wherein:
the providing of the value to the download device is based on an indication that the upload user authorized the download user to access the catalog to which the variable belongs; and the method further comprises
receiving the indication from the upload user.

15. The method of claim 13, wherein:
in response to the providing of the value to the download device, notifying the upload user that the download user accessed the catalog to which the variable belongs.

16. The method of claim 1 further comprising:
storing the upload spreadsheet with the database generated based on the upload spreadsheet, the stored upload spreadsheet corresponding to the data record in which the value of the measure quantifies the variable whose variable name includes the owner name for the upload row and the measure of the upload row.

17. A non-transitory machine-readable storage medium comprising instructions that, when executed by one or more processors of a machine, cause the machine to perform operations comprising:

receiving an upload spreadsheet generated by modification of a source spreadsheet to include a first control code that labels a column of owner names, include a second control code that labels a column of measures, and include a third control code that labels a column of values of measures;
parsing the received upload spreadsheet based on the first, second, and third control codes, the received upload spreadsheet including an upload row that specifies an owner name for the upload row, a measure of the upload row, and a value of the measure; and
generating a database that contains a data record in which the value of the measure quantifies a variable whose variable name includes the owner name of the upload row and the measure of the upload row,
the generating of the database being based on the upload row and on the first, second, and third control codes parsed from the received upload spreadsheet.

18. The non-transitory machine-readable storage medium of claim 17, wherein:
the receiving of the upload spreadsheet is from an upload device of an upload user; and the operations further comprise:
receiving a query from a download device of a download user, the query being generated from a download spreadsheet that labels a column of owner names with the first control code and labels a column of values with the third control code, the download spreadsheet including a download row that specifies the owner name but does not specify the value of the measure; and
providing the value that quantifies the variable to the download device in response to the query, the download device modifying the download spreadsheet into an output spreadsheet by inclusion of the value within the download row that specifies the owner name.

19. A system comprising:
an upload module configured to receive an upload spreadsheet generated by modification of a source spreadsheet to include a first control code that labels a column of owner names, include a second control code that labels a column of measures, and include a third control code that labels a column of values of measures;
a parse module configured to parse the received upload spreadsheet based on the first, second, and third control codes, the received upload spreadsheet including an upload row that specifies an owner name for the upload row, a measure of the upload row, and a value of the measure; and
a processor configured by a generation module to generate a database that contains a data record in which the value of the measure quantifies a variable whose variable name includes the owner name of the upload row and the measure of the upload row,
the generating of the database being based on the upload row and on the first, second, and third control codes parsed from the received upload spreadsheet.

20. The system of claim 19, wherein:
the upload module is configured to receive the upload spreadsheet from an upload device of an upload user; and the system further comprises:
a query module configured to receive a query from a download device of a download user, the query being generated from a download spreadsheet that labels a column of owner names with the first control code and labels a column of values with the third control code, the download spreadsheet including a download row that specifies the owner name but does not specify the value of the measure; and a share module configured to provide the value that quantifies the variable to the download device in response to the query, the download device modifying the download spreadsheet into an output spreadsheet by inclusion of the value within the download row that specifies the owner name.

21. The system of claim 20, wherein:

the share module is configured to receive an indication that the upload user authorized the download user to access the value and provide the value to the download device based on the indication received from the upload user.

* * * * *